May 2, 1967  O. S. FREDERIKSEN  3,316,790
CUTTING APPARATUS
Filed Sept. 27, 1965  2 Sheets-Sheet 1
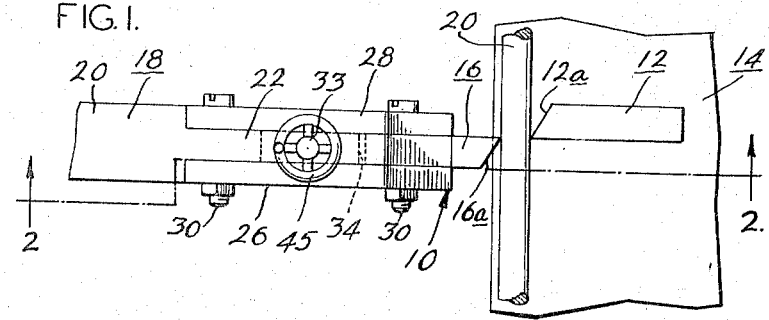
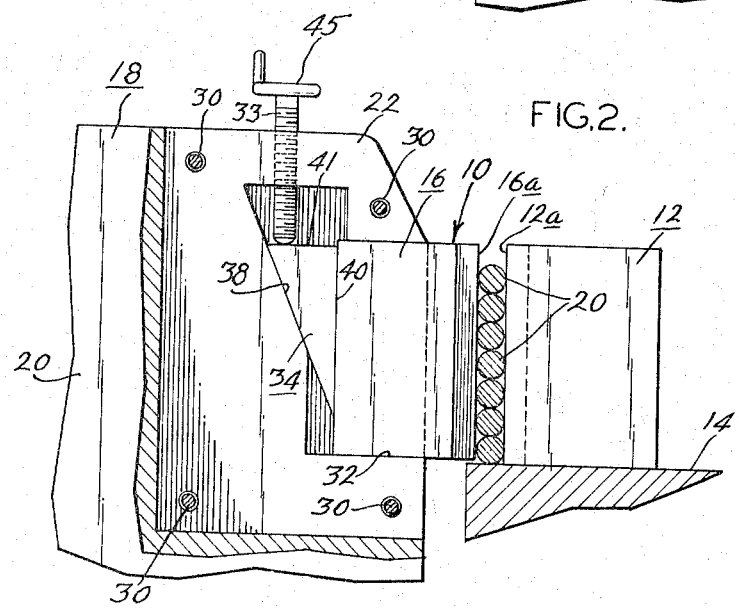
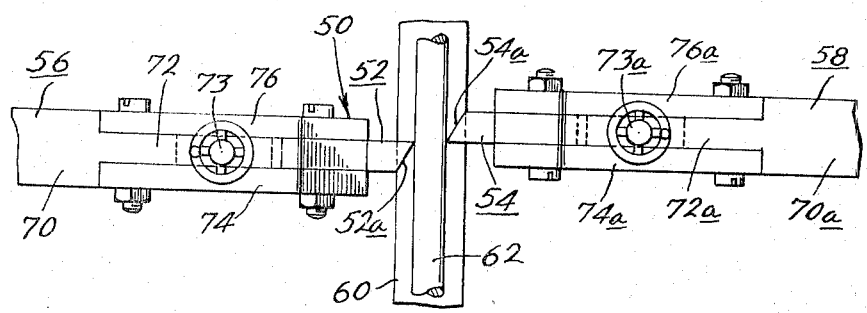
INVENTOR:
BY OVE STEEN FREDERIKSEN
Howson & Howson
ATTYS.

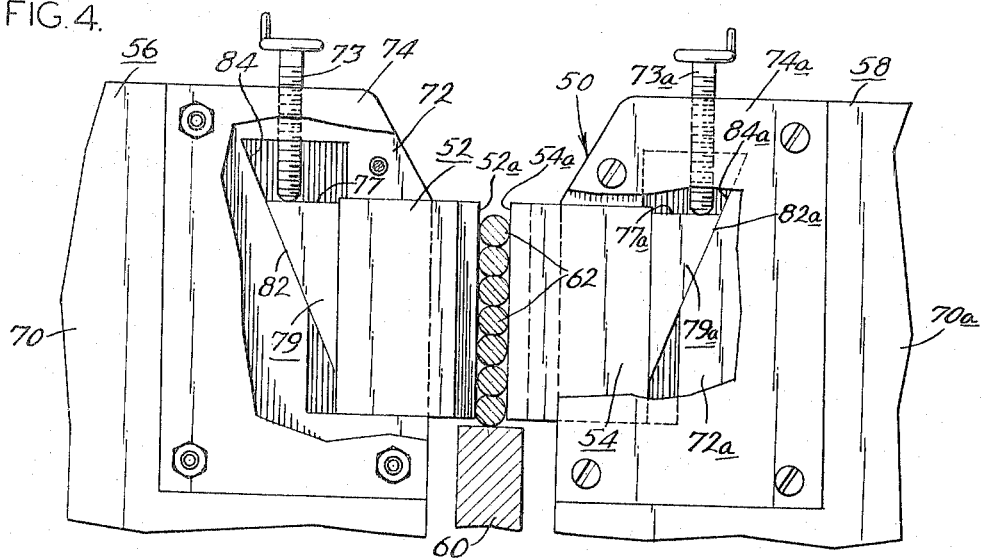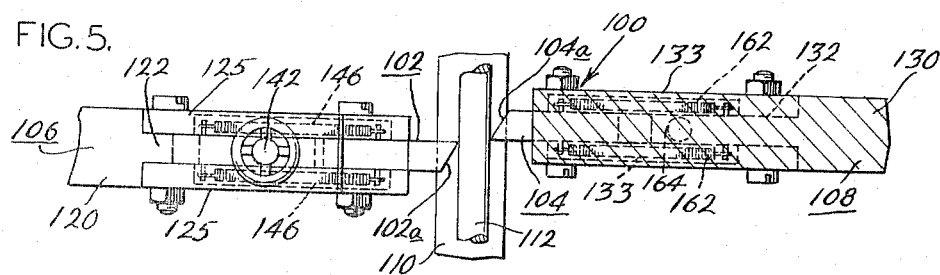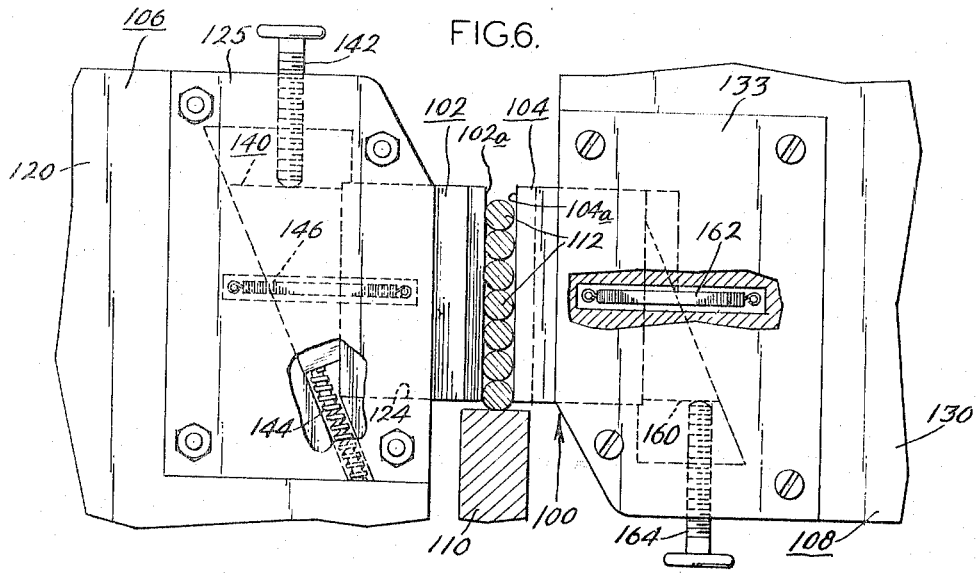

United States Patent Office 3,316,790
Patented May 2, 1967

3,316,790
CUTTING APPARATUS
Ove Steen Frederiksen, Sydvestvej 99, Glostrup, Denmark
Filed Sept. 27, 1965, Ser. No. 490,616
3 Claims. (Cl. 83—679)

The present invention relates to new and useful improvements in cutting or shearing apparatus used for cutting material such as round bar stock.

This is a continuation-in-part application of my prior U.S. application Ser. No. 326,044, filed Nov. 26, 1963, entitled, "Shears for the Shearing of Sections and Bars," and now abandoned.

Apparatus of this type generally comprises a pair of knives having confronting parallel cutting edges which are movable in a direction toward and away from one another to shear the stock which is positioned in a gap between the cutting edges of the knives. In these apparatus generally one of the knives mounts a bolt which is movable in an oblong slotted opening in the body of the apparatus whereby the size of the gap between the knives may be selectively adjusted. It has been found, however, that the bolt which is usually oriented perpendicularly to the direction of movement of the knives is not able to effectively withstand the extremely heavy pressures over an extended period of use. Thus, it has been found that it is necessary to bolster the knives with blocks or keys. However, by this arrangement the adjustment of the gap between the cutting edges of the knives is difficult. In practice, therefore, the gap between the cutting edges is too wide or too narrow whereby the shearing action is oblique and the material being cut is deformed. Furthermore, the shearing of the stock material will take longer than necessary when the gap between the knife edges is too wide.

With the foregoing in mind, an object of the present invention is to provide shearing apparatus of the above type incorporating a simple and very strong adjustment mechanism for adjusting the width of the knife gap, which mechanism is easy to operate to adjust the gap between the knife edges and is extremely effective for the purposes intended. To this end, in accordance with the present invention at least one of the knives is mounted for adjusting movement in its holder in a direction toward and away from the other knife and the adjusting mechanism for adjusting the cutting edges of the knives comprises a triangularly shaped key, the inclined edge of which engages an inclined plane in the holder. One side of the key abuts the back of the knife and the other side of the key is adapted to be engaged by a screw spindle threadedly mounted in the holder.

By this arrangement, the gap between the cutting edges of the knives may be adjusted simply by turning the screw spindle which causes the key to slide on the inclined plane of the body portion of the housing, thus moving the movable knife in the fixed guides until it rests against the material. On the other hand, if the gap is too narrow to accommodate the items to be sheared, the screw spindle is backed off to permit the knife to be moved to increase the gap between the cutting edges of the knives. By the present invention, the gap between the knife edges may be selectively adjusted to accommodate the precise cross section of the material to be sheared to insure a clean cut of the material without any parts of the machine or apparatus binding.

These and other objects of the present invention and the various features and details of the operation and construction of the shearing apparatus are more fully set forth and described in connection with the accompanying drawings wherein:

FIG. 1 is a fragmentary plan view of a shearing or cutting apparatus constructed in accordance with the present invention;

FIG. 2 is a sectional view of the shearing apparatus taken on lines 2—2 of FIG. 1;

FIG. 3 is a fragmentary plan view of another embodiment of shearing apparatus in accordance with the present invention;

FIG. 4 is a side elevational view of the shearing apparatus shown in FIG. 3 with parts broken away;

FIG. 5 is a fragmentary plan view partly in section of still another embodiment of shearing apparatus in accordance with the present invention; and FIG. 6 is a side elevational view of the apparatus shown in FIG. 5 with parts broken away to show the internal construction of the blade mounting.

Referring now to the drawings and particularly to the invention illustrated in FIGS. 1 and 2, the shearing apparatus generally designated by the numeral 10 includes a cutting blade or knife 12 having an elongated cutting edge 12a mounted on a support portion or base 14 of the framework or housing of the apparatus and a movable cutting blade or knife 16 carried by a holder having an elongated cutting edge 16a parallel to and cooperatively mounted relative to the edge 12a. The holder 18 is mounted for reciprocating movement by suitable means (not shown) to effect relative movement of the cutting edges 12a and 16a to shear material such as bar stock 20 positioned in the gap between the blades when the blades are in retracted position as shown in FIG. 2.

The blade holder 18 comprises a plate-like body portion 20 having a projection 22 at one end of reduced cross section which, as illustrated in FIG. 2, is of generally C-shaped configuration. A pair of side plates 26 and 28 of generally rectangular shape are fastened to the opposite sides of the projection 22 by means such as bolts 30 to define a slotted opening 32 for the knife blade 16.

In accordance with the present invention, adjustment means is provided for selectively adjusting the gap between the cutting edges of the cutting blades to accommodate material of varying cross section.

To this end there is provided in the present instance a key 34 in the form of a right-angled triangle, the inclined face or hypotenuse of the key 34 engaging an inclined wall 38 of the projection 22. One side 40 of the key abuts the back of the blade 16 as illustrated in FIG. 2 and the other side 41 of the triangle is engageable by a threaded adjusting screw 43 mounted in the upper leg of the projection 22 and manually rotatable by means of a hand wheel 45.

Considering now the operation of the cutting or shearing apparatus described above, this apparatus is designed to cut at one time a plurality of items of substantially the same cross section such as round bars. Now with particular reference to FIG. 2, the round bar stock 20 is placed in the gap between the cutting edges of the blades in a random bundle. If, prior to actuating the movable blade to cut the bars, the gap between the cutting edges is too great, unclean and jagged cutting action of the bars would result. If, however, the gap just accommodates the bars and the bars are placed one on top of the other in a single vertical row, the shearing action is straight and clean. To this end, in accordance with the present invention the gap between the cutting edges of the blades may be selectively varied prior to actutaion of the blades so that the bars are stacked in a single vertical row.

For example, if after the bars are stacked in the gap, there is too much of a space between the bars and blades, the hand wheel 45 is turned in a direction to move the wedge element 34 downwardly whereby the cutting blade 16 is moved toward the fixed blade 12 to narrow the gap. The action of the triangularly shaped wedge is self-locking so that the cutting blade once adjusted cannot be moved back again under the influence of the shearing pressure during the cutting action. If it is found that the gap between the blades is too narrow, the hand wheel 45 is simply turned the opposite direction to retract screw 33 and now the cutting blade 16 may be moved to the left with respect to FIG. 2 thereby displacing the wedge upwardly until it engages the end of the threaded screw 33.

There is illustrated in FIGS. 3 and 4 another embodiment of cutting apparatus in accordance with the present invention. This embodiment is similar to that described above except that both of the cutting blades are selectively adjustable to vary the gap between the cutting edges of the blades. To this end, as best illustrated in FIG. 4, the cutting apparatus generally designated by the numeral 50 comprises a pair of cutting blades 52 and 54 having elongated parallel cutting edges 52a and 54a mounted in holders 56 and 58 respectively.

The holders are disposed on opposite sides of a support 60 for stock material such as round bars 62 to be cut and form part of the framework or housing of the apparatus. The blade holders are identical in construction and thus only will be described in detail and corresponding parts of the holder 58 of identical construction will be given the same numeral with a subscript "a." Thus, the holder 56 comprises a plate-like body portion 70 having a projection 72 of reduced cross section which as illustrated, is of generally C-shaped configuration. A pair of side plates 74 and 76 of generally rectangular shape are fastened to opposite sides of the projection by means of bolts thereby to define a slotted opening for the blade 52.

The blades 52 and 54 are selectively adjustable relative to one another to vary the gap between the cutting edges by means including a triangular wedge element 79 having an inclined side 82 which engages and rides on an inclined wall 84 of the projection 72 and a threaded screw member 73 which engages a side wall 77 of the wedge in the manner illustrated in FIG. 4. By this arrangement, when it is desired to vary the gap between the cutting edges of the blade for actuation relative to one another, the screw member 73 may be turned in one direction to move the triangularly shaped wedge elements downwardly to narrow the gap and in the opposite direction to permit the wedge elements to be moved upwardly to increase the gap between the cutting edges of the blades.

There is shown in FIGS. 5 and 6 still another embodiment of cutting apparatus in accordance with the present invention. This apparatus is generally designated by the numeral 100 and includes a pair of cutting blades 102 and 104 having elongated parallel cutting edges 102a and 104a. The cutting blades 102 and 104 are mounted in holders 106 and 108 respectively which are actuatable by suitable means to move the cutting blades toward and away from one another during the cutting cycle. As best illustrated in FIG. 6, the holders are disposed on opposite sides of a support portion 110 of the framework or housing of the apparatus for supporting the material such as bar stock 112 to be cut.

The holder 106 comprises a plate-like body portion 120 having a projection 122 of a reduced cross section which is of generally C-shaped configuration defining a pair of parallel seats 124 and 126 which guide the blade 102. A pair of plate members 125 of rectangular shape are fastened on opposite sides of the proection 122 to define the side closure for the blade 102. The holder 108 is of similar configuration except that it is inverted comprising a plate-like body portion 130 having a projection of reduced cross section 132 also of C-shaped configuration with a pair of plate members to define a slotted opening between the plates for blade 104.

In accordance with this embodiment of the invention, the gap between the cutting edges of the blades is selectively adjustable by means including a triangularly shaped wedge in the holders which are actuated in a direction to move the blades in and out with respect to the holder thereby to vary the gap between the cutting edges. The wedge 140 for the holder 106 is engaged along one face by a threaded screw element 142. Biasing means in the form of compression spring 144 is provided to normally urge the wedge 140 upwardly upon upward movement of the screw 142. In this embodiment of the invention biasing means in the form of springs 146 is provided to normally retain the blade 102 in engagement with the wedge 140 and normally urge it in the direction away from the cutting blade 104. The holder 108 similarly has a wedge 160 of triangular shape and the spring biasing means 162 normally urging the cutting blade 104 to the right or away from the other blade and a screw element 164 which engages the lower side edge of the wedge 160.

By reason of the spring biasing means, the blades are moved in either direction without having to be retracted manually upon adjustment of the wedge elements. It is noted since the holder 108 is inverted, there is no need for spring biasing means to urge the wedge 160 downwardly bceause when the screw element 164 is adjusted the wedge 160 will normally move in that direction by gravity. Thus, this embodiment of the invention is extremely simple to operate.

While particular embodiments of the present invention have been illustrated and described herein, it is not intended to limit the invention and changes and modifications may be made therein within the scope of the following claims.

I claim:
1. Cutting apparatus comprising a support frame, a pair of cutting blades having elongated parallel cutting edges mounted in said frame, said blades adapted to be positioned relative to one another to provide a gap between the cutting edges to receive material to be cut, means including a holder for mounting each of said blades, each of said holders including a member having a C-shaped projection defining a guide opening for said one blade and including an inclined wall, a wedge element of right-angled triangular shape mounted in said opening having an inclined face engaging said inclined wall and one side engaging the back of the cutting blade, a threaded adjusting screw mounted in said member engaging the other side of said wedge operable to move said wedge to displace said cutting blade thereby to effect selective adjustment of the gap between the cutting edges of the cutting blades, spring biasing means mounted in each holder and connected to the cutting blades mounted in the respective holders and adapted to normally urge said blades in a direction against its respective wedge element.

2. Cutting apparatus as claimed in claim 1 wherein said holders are inverted with respect to one another.

3. A cutting apparatus as claimed in claim 1 including second biasing means mounted in one of said holders operable to effect movement of the wedge element in said one holder in a direction to normally urge the blade outwardly with respect to said holder.

References Cited by the Examiner
UNITED STATES PATENTS

| | | | |
|---|---|---|---|
| 1,718,987 | 7/1929 | Smith | 83—700 X |
| 3,093,024 | 6/1963 | Pell | 83—700 X |

ANDREW R. JUHASZ, *Primary Examiner.*